(12) United States Patent
Klaehn et al.

(10) Patent No.: US 10,975,951 B2
(45) Date of Patent: Apr. 13, 2021

(54) SEALED ROTARY TABLE

(71) Applicant: Nexen Group, Inc., Vadnais Heights, MN (US)

(72) Inventors: Isaac Kenneth Klaehn, Stillwater, MN (US); Anthony Will Kliber, Andover, MN (US)

(73) Assignee: Nexen Group, Inc., Vadnais Heights, MN (US)

( * ) Notice: Subject to any disclaimer, the term of this patent is extended or adjusted under 35 U.S.C. 154(b) by 345 days.

(21) Appl. No.: 15/762,158

(22) PCT Filed: Sep. 22, 2016

(86) PCT No.: PCT/US2016/053051
§ 371 (c)(1),
(2) Date: Mar. 22, 2018

(87) PCT Pub. No.: WO2017/053533
PCT Pub. Date: Mar. 30, 2017

(65) Prior Publication Data
US 2020/0240509 A1 Jul. 30, 2020

Related U.S. Application Data

(60) Provisional application No. 62/222,522, filed on Sep. 23, 2015.

(51) Int. Cl.
| | | |
|---|---|---|
| *F16H 57/029* | (2012.01) | |
| *H02K 11/21* | (2016.01) | |
| *H02K 5/10* | (2006.01) | |

(Continued)

(52) U.S. Cl.
CPC ............. *F16H 57/029* (2013.01); *H02K 5/10* (2013.01); *H02K 7/088* (2013.01); *H02K 7/116* (2013.01);

(Continued)

(58) Field of Classification Search
CPC .......... H02K 7/088; H02K 11/21; H02K 5/10; B23Q 16/102; B66C 23/84
See application file for complete search history.

(56) References Cited

U.S. PATENT DOCUMENTS

| | | | | |
|---|---|---|---|---|
| 3,633,443 A | * | 1/1972 | Schussler | B23Q 1/40 74/822 |
| 5,834,662 A | * | 11/1998 | Stoll | B66C 23/84 74/425 |

(Continued)

FOREIGN PATENT DOCUMENTS

| | | |
|---|---|---|
| CN | 102042366 A | 5/2011 |
| DE | 9311316 U1 | 10/1993 |

(Continued)

*Primary Examiner* — Thomas C Diaz
(74) *Attorney, Agent, or Firm* — Alan D. Kamrath; Mayer & Williams PC

(57) ABSTRACT

A motion control apparatus in the form of a sealed rotary table (10) includes a first annular seal (54) located between a bearing cap (48) of a case and an inner diameter of a cylindrical flange (60), and a second annular seal (56) located between a seal ledge (22) of an annular wall (18) of the case and the outer diameter of the cylindrical flange (60). An enclosure (24), the annular wall (18) and a planar annular disc (16) are integrally formed as a single piece part of homogenous material. A drive station (12) includes a rotor (110) rotatably mounted inside an annular sleeve (118) by a bearing (140) inside an annular end cap (136) at an axial extent less than that of the annular sleeve (118). An encoder (150) is located within the annular end cap (136) and within the axial extent of the annular sleeve (118).

17 Claims, 4 Drawing Sheets

(51) Int. Cl.
    *H02K 7/08*      (2006.01)
    *H02K 7/116*     (2006.01)
    *H02K 21/14*     (2006.01)
    *F16H 57/02*     (2012.01)

(52) U.S. Cl.
    CPC ............. *H02K 11/21* (2016.01); *H02K 21/14* (2013.01); *F16H 2057/02034* (2013.01); *F16H 2057/02073* (2013.01)

(56) References Cited

U.S. PATENT DOCUMENTS

| | | | |
|---|---|---|---|
| 5,957,000 A * | 9/1999 | Pecorari | F16C 33/78 74/425 |
| 8,074,681 B2 | 12/2011 | van Amelsfoort | |
| 8,448,543 B2 * | 5/2013 | Tatsuda | B23Q 16/102 269/57 |
| 9,196,777 B2 | 11/2015 | Lucas Morata | |
| 9,279,477 B2 * | 3/2016 | Hein | F16H 55/12 |
| 9,835,240 B2 | 12/2017 | Chauvrat et al. | |
| 10,054,214 B2 | 8/2018 | Monnet et al. | |
| 2003/0066370 A1 * | 4/2003 | Russ | B66C 23/84 74/414 |
| 2004/0244521 A1 | 12/2004 | Russ et al. | |
| 2011/0241498 A1 | 10/2011 | Vedy | |
| 2015/0211624 A1 | 7/2015 | Pasaribu et al. | |

FOREIGN PATENT DOCUMENTS

| | | | |
|---|---|---|---|
| DE | 102013220495 A1 | 4/2015 | |
| EP | 1134181 A2 | 9/2001 | |
| JP | H08319749 A | 12/1996 | |
| JP | H09308171 A | 11/1997 | |
| WO | WO9924730 A1 | 5/1999 | |
| WO | WO-2013107518 A1 * | 7/2013 | ......... F16H 57/0471 |

* cited by examiner

SEALED ROTARY TABLE

BACKGROUND

A motion control apparatus, particularly, a rotary motion control apparatus, and, specifically, a sealed rotary table are shown and described.

With the introduction of ring drives into the market place, there is a continuing need for motion control apparatus which is modular in design to provide flexibility in application, as well as being stronger and easier to manufacture.

SUMMARY

This need and other problems in the field of motion control apparatus are solved by providing a sealed rotary table including a bearing rotatably mounting an output to a case about an axis and within an annular wall of the case, and a drive station mounted to the case and rotating the output. The output includes a cylindrical flange having outer and inner diameters, with a first annular seal located between the case and the inner diameter of the output, and with a second annular seal located between the annular wall of the case and the outer diameter of the output.

In further aspects, a case, including a planar annular disc and the annular wall extending axially from the planar annular disc, further includes an enclosure having a panel integrally connected to the annular wall and extending radially outward opposite to the output, a top integrally formed with the panel, and a lower opening defined by the panel. The panel, the top and the lower opening have cross sections perpendicular to the axis which are U-shaped. The annular wall includes a side opening corresponding to the enclosure, with the planar annular disc including an arcuate cutout corresponding to the enclosure and the side opening, and with the planar annular disc, the annular wall and the enclosure being integrally formed as a single piece part.

In a still further aspect, a drive station includes a housing including an annular end and an annular sleeve extending parallel to the axis from the annular end and terminating in a sleeve end at a sleeve axial extent from the annular end. A rotor is rotatably mounted inside the annular sleeve and terminating in a rotor axial extent from the annular end, with the rotor axial extent being less than the sleeve axial extent. An annular end cap is secured to the sleeve end. A rotor bearing rotatably mounts the rotor inside the annular end cap at a bearing axial extent from the annular end less than the sleeve axial extent and generally equal to or less than the rotor axial extent. An encoder, received in the annular end cap, has an inner axial extent less than the sleeve axial extent, with the encoder rotationally related to the rotor. A motor is located concentrically to the rotor and between the annular end and the annular end cap and within the annular sleeve, with the annular end and the annular sleeve integrally formed as a single unitary piece.

Illustrative embodiments will become clearer in light of the following detailed description in connection with the drawings.

DESCRIPTION OF THE DRAWINGS

The illustrative embodiments may best be described by reference to the accompanying drawings where.

Figure 1:
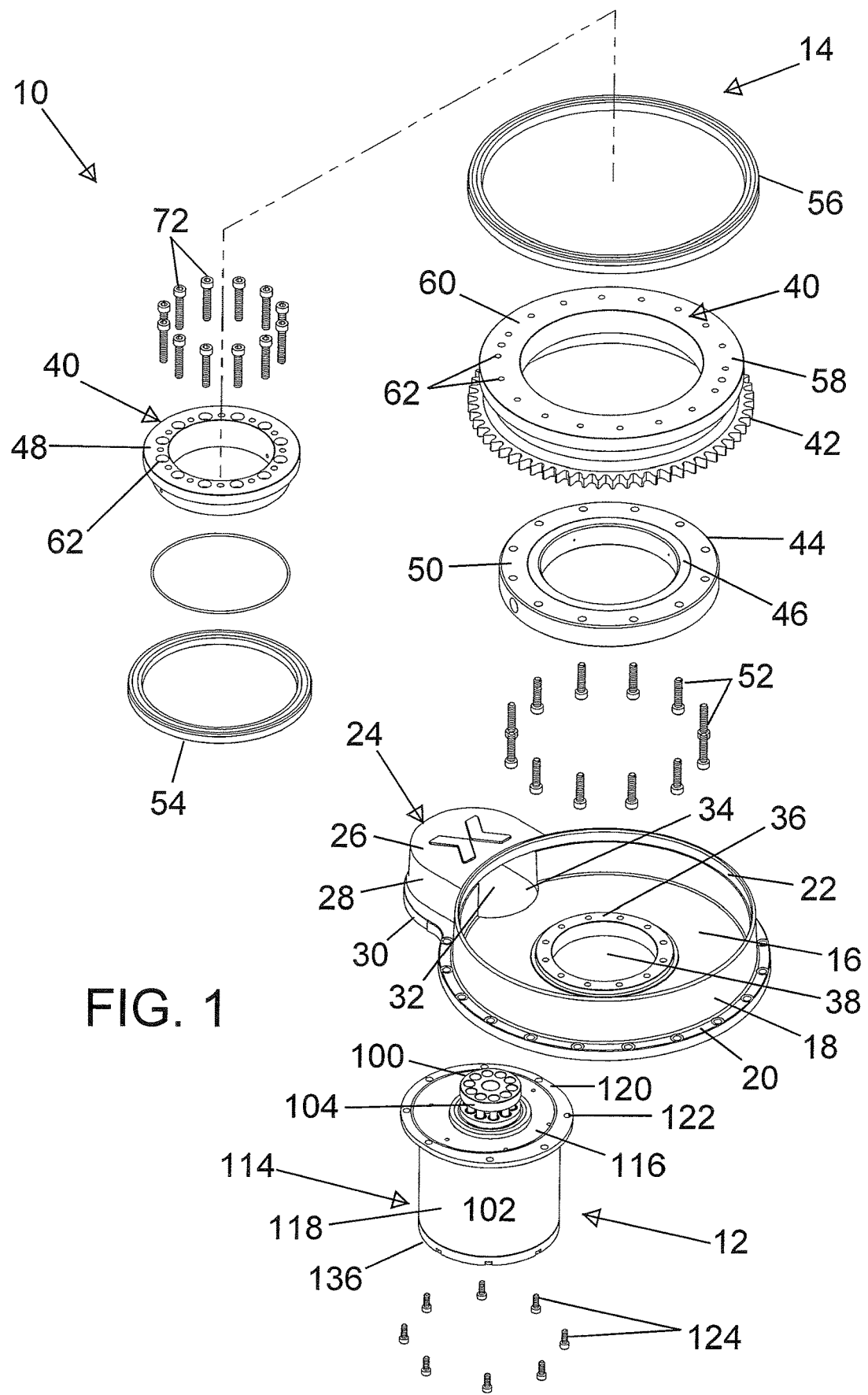
FIG. 1 shows an exploded perspective view of a sealed rotary table.
Figure 2:
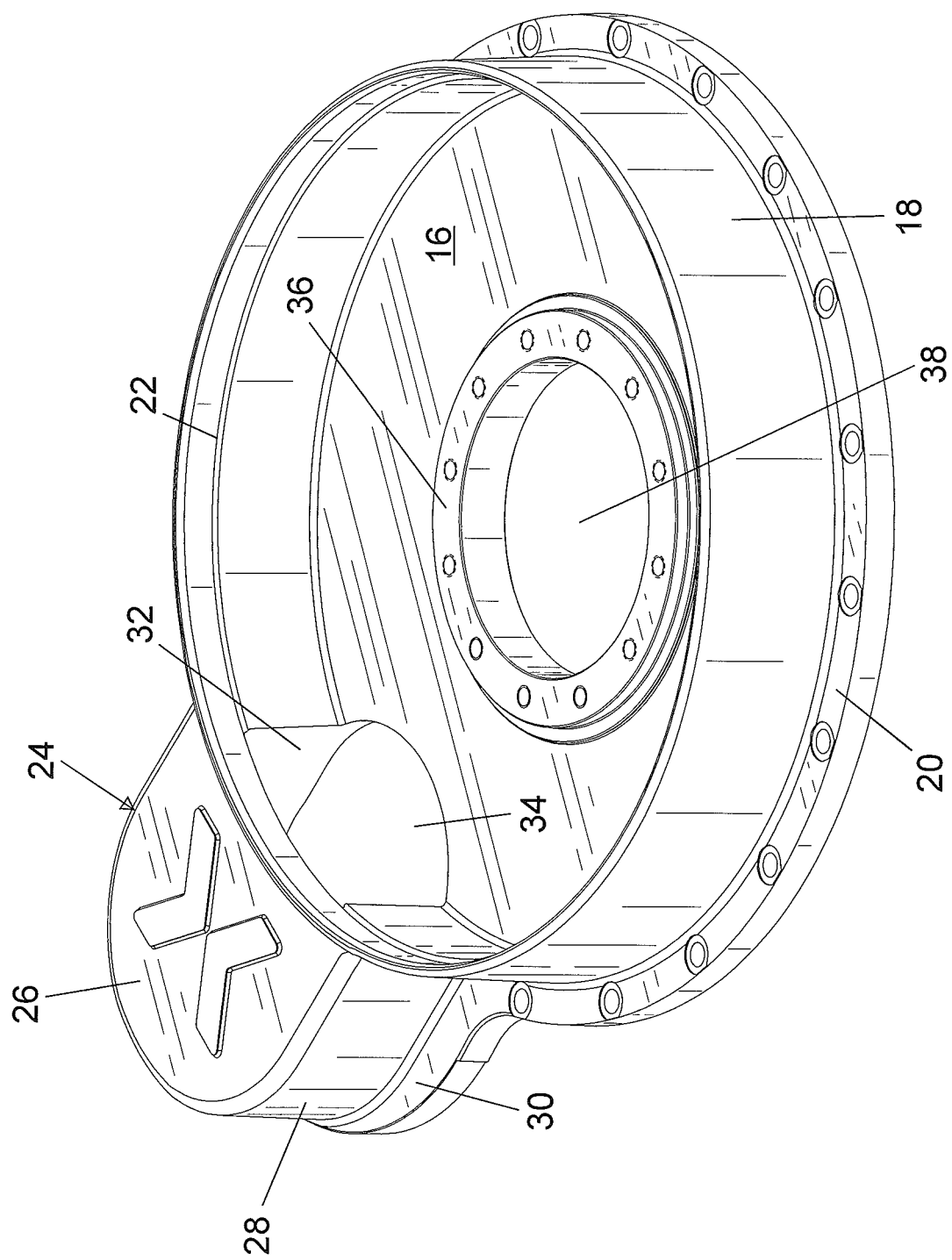
FIG. 2 shows a perspective view of a component of the sealed rotary table of FIG. 1.
Figure 3:
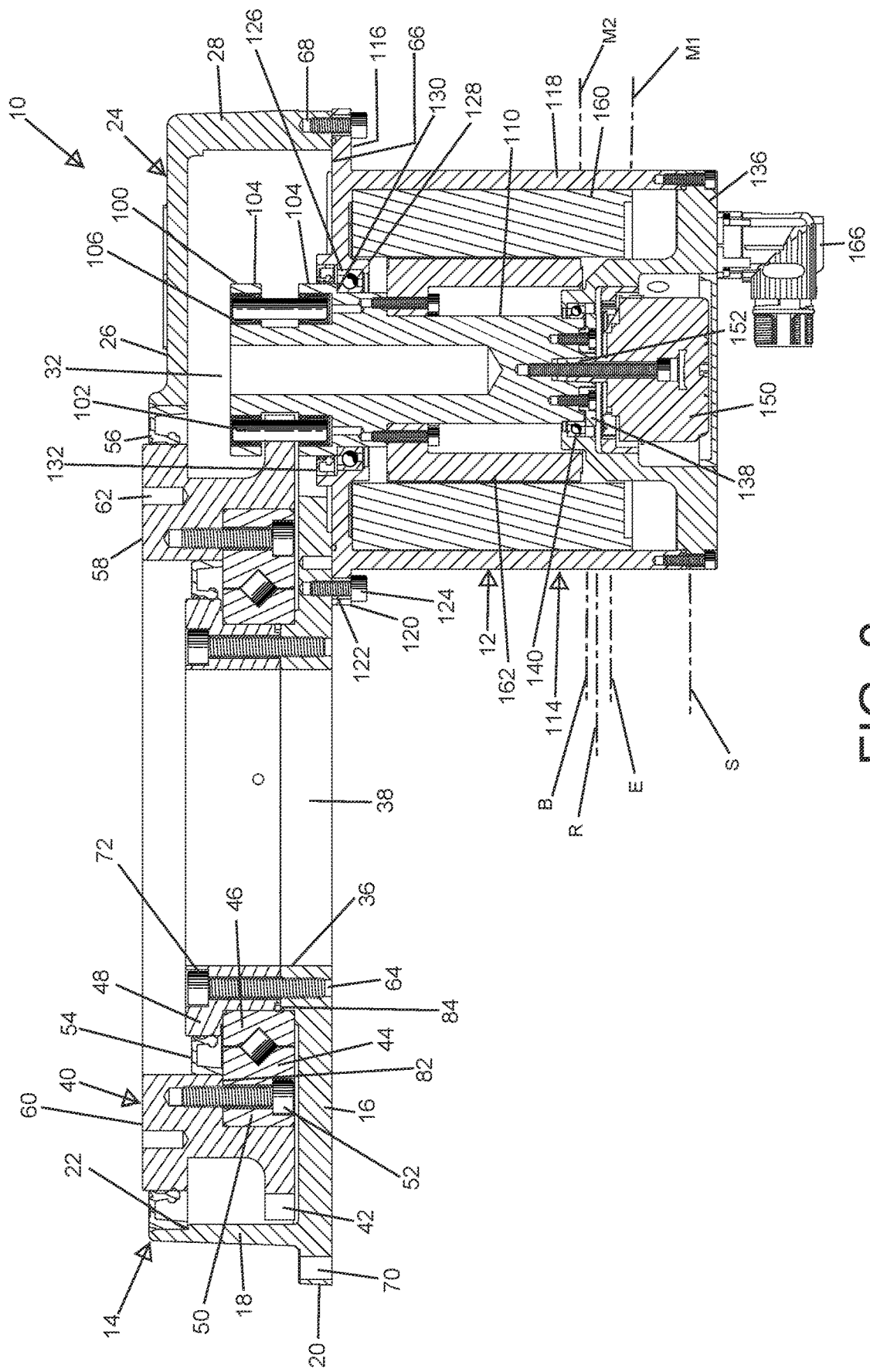
FIG. 3 shows a sectional view of the sealed rotary table of FIG. 1.
Figure 4:
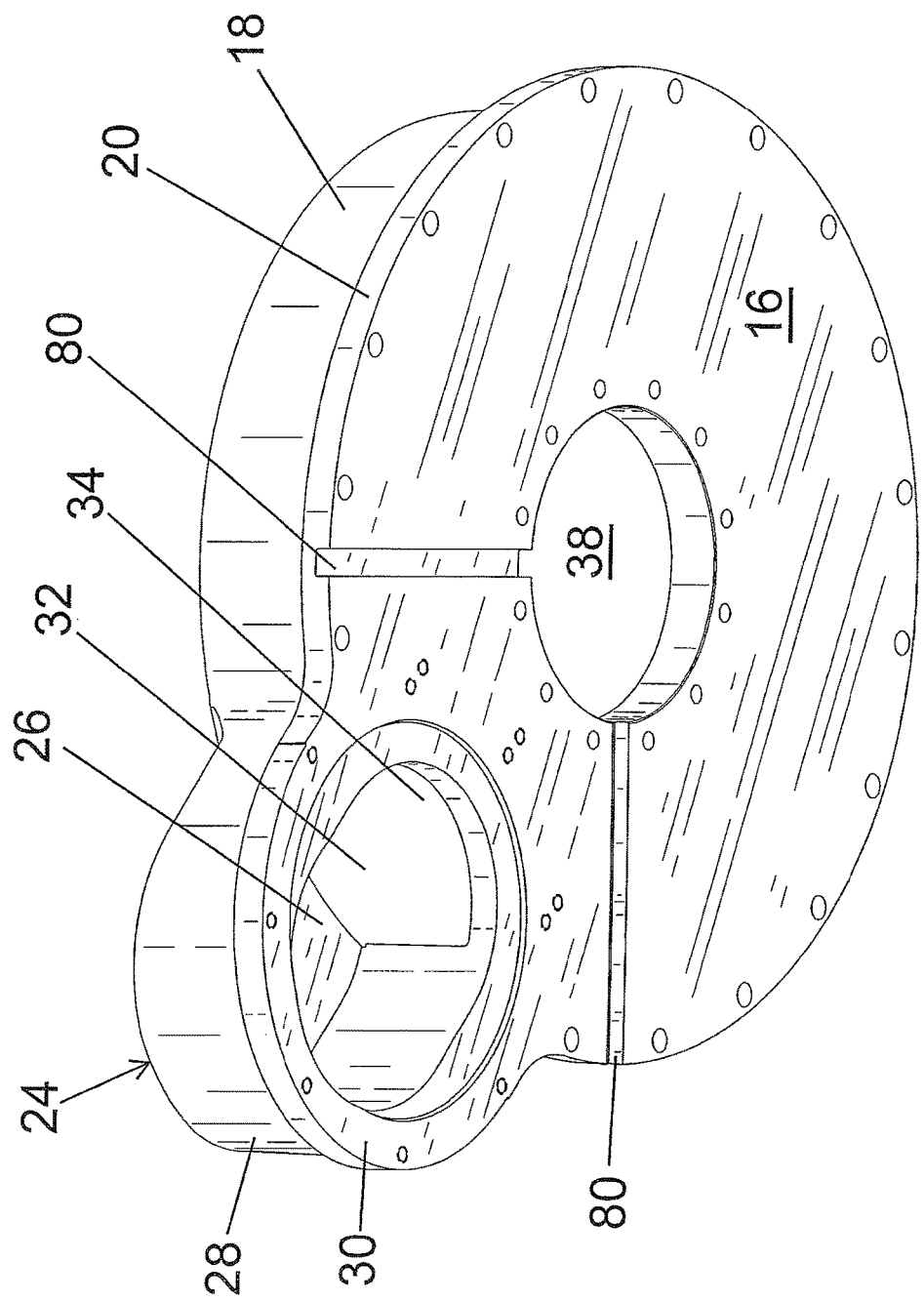
FIG. 4 shows a bottom perspective view of the component of the sealed rotary table of FIG. 2.

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", "axial", "radial", "longitudinal", "lateral", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

A sealed rotary table is shown in the drawings and generally designated 10. Rotary table 10 generally includes a drive station 12 and a platform 14. Platform 14 includes a planar annular disc 16 having an annular wall 18 extending axially from annular disc 16 located concentrically within an outer periphery of annular disc 16 to define a mounting flange 20 located radially outward of annular wall 18. A seal ledge 22 is located at the free end of annular wall 18. Platform 14 further includes an enclosure 24 including a top 26 generally of a U-shape parallel to annular disc 16 integrally connected to annular wall 18 and extending radially outwardly opposite to seal ledge 22. Enclosure 24 further includes a U-shaped panel 28 integrally extending axially from the outer periphery of top 26, integrally extending from annular wall 18, and terminating in a flange 30 integrally connected to mounting flange 20 and extending radially outward of panel 28. The free edge of panel 28 opposite to top 26 defines a lower opening. An opening 32 is formed in annular wall 18 corresponding to enclosure 24, and annular disc 16 includes an arcuate cutout 34 corresponding to enclosure 24 and opening 32. Annular disc 16 further includes an annular protrusion 36 extending from its top surface concentrically around a center opening 38 and extending axially from annular disc 16 in the same direction as annular wall 18. Annular disc 16 also includes first and second channels 80 extending radially from center opening 38 to the outer periphery of mounting flange 20. Annular disc 16, annular wall 18, annular protrusion 36 and enclosure 24 are integrally formed as a single, inseparable element formed of homogenous material and define a case.

Platform 14 further includes an annular output 40 including an outer driven gear 42. A bearing 44 has an inner race 46 abutting with annular protrusion 36 and sandwiched against annular disc 16 by a bearing cap 48 mounted to protrusion 36, with bearing 44 rotatably mounting output 40 to the case about an axis and within the case. Bearing cap 48 has generally L-shaped cross sections and includes an axially extending portion and a radially extending portion extending radially onwardly of the axially extending portion. An O-ring 84 is provided in a cavity formed in a lower surface of the free end of the axially extending portion of bearing cap 48 abutting with an upper annular free end of annular protrusion 36 and is in sealing engagement with the inner axial surface of inner race 46. Race 46 abuts with the axially extending portion of bearing cap 48 and with annular protrusion 36. Outer race 50 of bearing 44 is connected to annular output 40 such as by fasteners 52 extending through race 50 and suitably secured to output 40 such as by threading and extending parallel to the rotation axis of output 40. An annular seal 54 is supported upon outer race 50 and extends between the annular free end of the radially extending portion of bearing cap 48 and output 40, and an annular seal 56 is supported upon seal ledge 22 and extends between annular wall 18 and output 40.

The normal intent of output 40 is to alter the speed and torque of another adjacent or meshed part/assembly. Bearing 44 is used to provide low friction rotation between a mounting surface 58 and outer driven gear 42. It should be appreciated that output 40 in rotary table 10 has multiple functionalities. Output 40 includes a cylindrical flange 60, a locating pilot, mounting surface 58, and mounting holes 62 providing a large open center and for attaching componentry. Outer driven gear 42 is parallel to, intermediate, and spaced from planar annular disc 16 and cylindrical flange 60, with outer drive gear 42 having a radial extent outward of cylindrical flange 60. Mounting holes 62 extend axially from a top surface of cylindrical flange 60 and radially intermediate the inner and outer diameters of cylindrical flange 60. The outer and inner diameters of cylindrical flange 60 also act as sealing surfaces for seals 56 and 54 to inhibit contamination from reaching internally. Output 40 further includes an annular pilot recess 82 on a lower surface thereof for locating outer race 50 and for attachment by fasteners 52 extending parallel to the rotation axis of output 40 and extending through race 50 and suitably secured to output 40 such as by threading. The shape of output 40 supports all of these functions while accepting the required meshing geometry of a mating pinion 100.

Output 40 is a single, inseparable element formed of homogeneous material to provide increased stiffness between driven torque provided by output 40 and the added componentry, improving servo controllability and predictability. Further, improved manufacturing stack ups is provided between bearing rotation, user output connection, and gear tooth variability. Optimized machining of gear tooth variation about the bearing center rotation improves the overall accuracy specifications. Added componentry spinning true to the bearing's center of rotation minimizes rotational error and vibration in applications. Further, a single piece part with all of the capabilities listed above reduces cost and assembly time, thus improving manufacturability.

Similarly, platform 14 provides multiple functionalities. Protrusion 36 provides increased rigidity and supports and captures bearing 44. Annular wall 18 provides increased rigidity, internally shields rotary table 10 from the outside environment and includes seal ledge 22. Radially extended, top-enclosed enclosure 24 encapsulates the drive station 12 of rotary table 10 providing additional stiffness to combat the reaction loads of dynamic movements to resist deflection from reaction forces between driven gear 42 and pinion 100 while shielding drive station 12 from the outside environment. An open slot 66 located in the bottom of enclosure 24, opening 32, and arcuate cutout 34 provide full disengagement and re-engagement of drive station 12 for assembly and maintenance purposes. Open slot 66 is surrounded by mounting holes 68 for attaching drive station 12. Mounting flange 20 provides mounting holes 70 for installation in the user's application, and channels 80 provide a route for wiring, tubing or the like to pass from center opening 38 past the periphery of mounting flange 20 on the user's application.

Likewise, the bearing cap 48 captures bearing 44 through the use of fasteners 72 threaded into mounting holes 64 in protrusion 36. The outer diameter of bearing cap 48 also acts as a sealing surface for seal 54. Radial holes can be provided in bearing cap 48 to provide access to the central bearing's greasing holes.

Pinion 100 is of the type of U.S. Pat. No. 6,023,989, which is incorporated herein by reference, and includes rollers 102 circumferentially arranged to be supported by a pair of annular plates 104. Each of rollers 102 of pinion 100 is rotationally supported between the pair of annular plates 104 by bearings 106 received in sockets in the pair of annular plates 104. Rollers 102 are positioned in parallel with each other at regular intervals in the circumferential direction and between the pair of annular plates 104 and are adapted to mesh concurrently with corresponding teeth of driver gear 42.

Pinion 100 is suitably connected to a rotor 110, in the form shown as being a stub shaft. In the form shown, pinion 100 is connected to rotor 110 by having rotor 110 and the pair of annular plates 104 integrally formed as a single, inseparable element formed of homogeneous material.

Generally, drive station 12 includes a housing 114 mounted to the case and rotating output 40, with housing 114 having an annular end 116. An annular sleeve 118 extends axially from annular end 116 parallel to the rotation axis of output 40 and of rotor 110 to define a mounting flange 120 located radially outward of annular end 116. A plurality of mounting holes 122 is formed in mounting flange 120 to receive fasteners 124 threadably received in mounting holes 68 and extending parallel to the rotation axis of output 40 and of rotor 110. Mounting holes 122 are non-circular and have a cross sectional size larger than the cross sectional size of fasteners 124. Mounting flange 120 and mounting holes 122 mount drive station 12, such that the axis of rotation of pinion 100 and rotor 110 is off center in order to accommodate different pinion and gear meshing diameters, providing flexibility and product modularity. Further, in order to achieve proper mesh of drive gear 42 and pinion 100, pinion 100 and rotor 110 must be preloaded into driven gear 42. It should be appreciated that the larger cross section of mounting holes 122 allows drive station 12 to be mounted with fasteners 124 in an untightened fashion, the drive station 12 to be preloaded, and then fasteners 124 are tightly fastened to fix drive station 12 in the preloaded position. Furthermore, slot 66, opening 32 and cutout 34 provide full disengagement and re-engagement of drive station 12 for modularity in assembly and maintenance purposes.

A bearing 126 is sandwiched between a radially inwardly extending flange 128 formed inside annular end 116 and a radially outwardly extending shoulder 130 formed on the lower annular plate 104. A seal 132 is supported upon a radially inwardly extending shoulder formed inside annular end 116 and extends between the annular end 116 and an axial surface of rotor 110 to seal drive station 12 from the environment.

Drive station 12 further includes an annular end cap 136 of a stepped frustoconical shape and a preload cap 138 removably connected to an end of rotor 110. End cap 136 is secured to the annular end of sleeve 118 such as by fasteners extending through end cap 136 and secured to sleeve 118, such as by being threaded. A bearing 140 is sandwiched between preload cap 138 and a radially extending inner flange of annular end cap 136. Bearing 140 is sandwiched between rotor 110 and an inner axial opening formed in annular end 116 and between a shoulder defined on rotor 110 and a flange extending radially inwardly from the inner axial opening of annular end 116. Bearing 140 is at an axial extent B from annular end 116 less than the axial extent S of sleeve 118 and generally equal to or less than the axial extent R of rotor 110. Thus, rotor 110 is rotatably supported and preloaded between bearings 126 and 140 in drive station 12.

An encoder 150 is received in an axial cavity formed in annular end cap 136 and includes a frustoconical protrusion 152 extending through preload cap 138 and into a corresponding bore formed in the end of rotor 110. The inner axial extent E of encoder 150 is less than axial extent S of sleeve 118. Encoder 150 is rotatably related to rotor 110. Rotary table 10 includes a motor located concentrically to rotor 110 and having a first motor component 160, such as windings, secured to housing 114 by suitable provisions such as adhesive and extends from annular end 116 to an axial extent Ml less than annular sleeve 118 but greater than rotor 110. A second motor component 162, such as permanent magnets, is secured to rotor 110 by suitable provisions such as fasteners threadly received in an axial end of lower annular plate 104. The second motor component 162 has an axial extent 1'12 less than axial extent Ml of first motor component 160, a first end axially spaced from annular end 116 and a second end generally at the same axial extent as rotor 110 from annular end 116.

It should be appreciated that rotor 110 and the pair of annular plates 104 formed as a single, inseparable element creates a high stiffness and allows rotor 110 to be shortened to fit inside the extents of motor components 160 and 162 to minimize the overall length of drive station 12. Further, encoder 150 is located within the axial extent of annular sleeve 118 of housing 114. Thus, drive station 12 has a minimal overall length.

Housing 114 provides support of rotor 110 through bearing 126, acts as a sealing diameter, houses and positions motor component 62, and pilots end cap 136. End cap 136 provides support of rotor 110 through bearing 140, acts as a sealing diameter, houses and captures encoder 150, and provides a connection 166 for servo cable receptacles. To minimize the overall length of drive station 12, end cap 136 fits inside annular sleeve 118 and motor components 160 and 162.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Motion control apparatus comprising, in combination: a case including a planar annular disc and an annular wall extending from the planar annular disc and having a free end; an output; a bearing rotatably mounting the output to the case about an axis and within the annular wall extending axially with respect to the axis from the planar annular disc, wherein the bearing includes an inner race and an outer race rotatable relative to the inner race, with the inner race intermediate the axis and the outer race, with the output removably abutting with the outer race; a drive station mounted to the case and rotating the output, with the output including a cylindrical flange having outer and inner diameters; a first annular seal located between the case and the inner diameter of the output; a second annular seal located between the annular wall of the case and the outer diameter of the output, wherein the case further includes an enclosure having a panel integrally connected to the annular wall and extending radially relative to the axis outward opposite to the output, a top formed with the panel, and a lower opening defined by the panel opposite to the top, with the panel and the lower opening having cross sections perpendicular to the axis which are U-shaped, with the annular wall including a side opening into the enclosure, with the planar annular disc including an arcuate cutout extending from the side opening, with the drive station extending in the lower opening, the side opening and the arcuate cutout and rotatably engaging with the output, with the drive station including a housing, with the housing including an annular end and an annular sleeve; a rotor rotatably mounted inside the annular sleeve about a drive axis and rotatably engaging with the output, with the rotor terminating in a rotor axial extent along the drive axis from the annular end opposite to the output, with the annular sleeve extending parallel to the drive axis from the annular end and terminating in a sleeve end at a sleeve axial extent along the drive axis from the annular end opposite to the output, with the rotor axial extent being less than the sleeve axial extent; an annular end cap secured to the sleeve end; a rotor bearing rotatably mounting the rotor inside the annular end cap at a bearing axial extent along the drive axis from the annular end opposite to the output, with the bearing axial extent less than the sleeve axial extent and generally equal to or less than the rotor axial extent; an encoder received in the annular end cap and having an inner axial extent along the drive axis closest to the annular end, with the encoder rotational with the rotor; and a motor component located concentrically to the rotor and between the annular end and the annular end cap and within the annular sleeve, with the rotor rotatable inside the motor component, with the annular end and the annular sleeve integrally formed as a single unitary piece; wherein the case includes a bearing cap of generally L-shaped cross sections and including an axially extending portion extending axially with respect to the axis and a radially extending portion extending radially with respect to the axis outwardly of the axially extending portion and terminating in an annular free end, with the axially and radially extending portions of the bearing cap removably abutting with the inner race, with the first annular seal located between the annular free end of the radially extending portion and the inner diameter of the output, with the planar annular disc, the annular wall and the enclosure being integrally formed as a single monolithic piece part, wherein the inner axial extent of the encoder is less than the sleeve axial extent, with the motor component having a motor extent less than the sleeve axial extent along the drive axis from the annular end opposite to the output and greater than the rotor axial extent.

2. Motion control apparatus comprising, in combination: a case including a planar annular disc and an annular wall extending from the planar annular disc and having a free end; an output; a bearing rotatably mounting the output to the case about an axis and within the annular wall extending axially from the planar annular disc, wherein the bearing includes an inner race and an outer race rotatable relative to the inner race, with the inner race being intermediate the axis and the outer race; a drive station mounted to the case and rotating the output, with the output including a cylindrical flange having outer and inner diameters; a first annular seal located between the case and the inner diameter of the output; and
a second annular seal located between the annular wall of the case and the outer diameter of the output, wherein the case includes a bearing cap of generally L-shaped cross sections and including an axially extending portion extending parallel to the axis and a radially extending portion extending radially relative to the axis outwardly of the axially extending portion and terminating in an annular free end, with the axially and radially extending portions of the bearing cap removably abutting with the inner race, with the first annular seal located between the annular free end of the radially extending portion and the inner diameter of the output, and with the output removably abutting with the outer race.

3. The motion control apparatus of claim 2, wherein the output further includes an annular pilot recess on a lower surface thereof, with the outer race of the bearing received in the annular pilot recess.

4. The motion control apparatus of claim 3 further comprising, in combination: fasteners extending parallel to the axis and through the outer race of the bearing and secured to the output in the annular pilot recess, with the first annular seal supported on the outer race of the bearing.

5. The motion control apparatus of claim 2, wherein the output further includes an outer driven gear extending parallel to, intermediate and spaced from the cylindrical flange and the planar annular disc, with the outer driven gear having a radial extent outward of the cylindrical flange.

6. The motion control apparatus of claim 2, wherein the cylindrical flange includes mounting holes extending axially from a top surface of the cylindrical flange and radially intermediate the inner and outer diameters.

7. The motion control apparatus of claim 2, wherein the case further includes an enclosure having a panel integrally connected to the annular wall and extending radially with respect to the axis outward opposite to the output; a top integrally formed with the panel; and a lower opening defined by the panel opposite to the top, with the panel, the top and the lower opening having cross sections perpendicular to the axis which are U-shaped, with the annular wall including a side opening into the enclosure, with the planar annular disc including an arcuate cutout extending from the side opening, with the drive station extending in the lower opening, the side opening and the arcuate cutout and rotatably engaging with the output, with the planar annular disc, the annular wall and the enclosure being integrally formed as a single monolithic piece part.

8. The motion control apparatus of claim 2, with the drive station comprising a housing, with the housing including an annular end and an annular sleeve; a rotor rotatably mounted inside the annular sleeve about a drive axis and rotatably engaging the output, with the rotor terminating in a rotor axial extent along the drive axis from the annular end opposite to the output, with the annular sleeve extending parallel to the drive axis from the annular end and terminating in a sleeve end at a sleeve axial extent along the drive axis from the annular end opposite to the output, with the rotor axial extent being less than the sleeve axial extent; an annular end cap secured to the sleeve end; a rotor bearing rotatably mounting the rotor inside the annular end cap at a bearing axial extent along the drive axis from the annular end opposite to the output less than the sleeve axial extent and generally equal to or less than the rotor axial extent; an encoder received in the annular end cap and having an inner axial extent along the drive axis closest to the annular end less than the sleeve axial extent, with the encoder rotationally related to the rotor; and a motor located concentrically to the rotor and between the annular end and the annular end cap and within the annular sleeve, with the annular end and the annular sleeve integrally formed as a single monolithic unitary piece.

9. The motion control apparatus of claim 8, wherein the annular end extends radially relative to the axis outward of the annular sleeve to define a mounting flange, with mounting holes formed in the mounting flange of non-circular cross sections perpendicular to the rotor, with the mounting holes located off center relative to the rotor.

10. The motion control apparatus of claim 8, further comprising a preload cap secured to the rotor intermediate the rotor and the encoder, with the rotor bearing sandwiched between the preload cap and the annular end cap.

11. The motion control apparatus of claim 2, wherein the outer race is located intermediate the planar annular disc and the output, wherein the cylindrical flange of the output extends over the outer race, with the inner diameter spaced from the inner race, with the radially extending portion extending over the inner race and spaced from the outer race, with the first annular seal extending over the inner and outer races.

12. Motion control apparatus comprising, in combination: a case including a planar annular disc and an annular wall extending from the planar annular disc and having a free end; an output; a bearing rotatably mounting the output to the case about an axis and within the annular wall extending axially from the planar annular disc; a drive station mounted to the case and rotating the output, with the output including a cylindrical flange having outer and inner diameters; a first annular seal located between the case and the inner diameter of the output; and a second annular seal located between the annular wall of the case and the outer diameter of the output; wherein the case includes a bearing cap of generally L-shaped cross sections and including an axially extending portion extending parallel to the axis and a radially extending portion extending radially relative to the axis outwardly of the axially extending portion and terminating in an annular free end, with the first annular seal located between the annular free end of the radially extending portion and the inner diameter of the output, wherein the planar annular disc extends parallel to but spaced from the cylindrical flange of the output, with the planar annular disc extending radially with respect to the axis outward of an axially extending annular protrusion terminating in an upper annular free end, with the axially extending portion of the bearing cap abutting with the upper annular free end and extending parallel to the axis and from the axially extending annular protrusion, with the bearing abutting with the planar annular disc and the axially extending annular protrusion, with the bearing sandwiched between the radially extending portion of the bearing cap and the planar annular disc of the case.

13. The motion control apparatus of claim 12 further comprising fasteners extending parallel to the axis and through the axially extending portion of the bearing cap and secured in the axially extending annular protrusion.

14. A motion control apparatus comprising, in combination: a housing, with the housing including an annular end and an annular sleeve; a rotor rotatably mounted inside the annular sleeve about a drive axis and having a rotor end configured to rotatably engage an output, with the rotor terminating in a rotor axial extent along the drive axis from the annular end and opposite to the rotor end, with the annular sleeve extending parallel to the axis from the annular end and terminating in a sleeve end at a sleeve axial extent along the drive axis from the annular end opposite to the rotor end, with the rotor axial extent being less than the sleeve axial extent; an annular end cap secured to the sleeve end; a rotor bearing rotatably mounting the rotor inside the annular end cap at a bearing axial extent along the drive axis from the annular end opposite to the rotor end less than the sleeve axial extent and generally equal to or less than the rotor axial extent; an encoder received in the annular end cap and having an inner axial extent along the drive axis closest to the annular end, with the encoder rotational with the rotor; and a motor located concentrically to the rotor and between the annular end and the annular end cap and within the annular sleeve, with the annular end and the annular sleeve integrally formed as a single unitary piece, wherein the motor comprises a first motor component secured to the annular sleeve and having a first motor extent along the drive axis from the annular end opposite to the rotor end, and a second motor component secured to the rotor and having a second motor extent along the drive axis from the annular wall opposite to the rotor end generally at a same radial extent as the rotor axial extent; wherein the inner axial extent of the encoder is less than the sleeve axial extent, with the first motor extent less than the sleeve axial extent and greater than the rotor axial extent.

15. The motion control apparatus of claim 14, wherein the annular end extends radially relative to the axis outward of the annular sleeve to define a mounting flange, with mounting holes formed in the mounting flange of non-circular cross sections perpendicular to the rotor, with the mounting holes located off center relative to the rotor.

16. The motion control apparatus of claim 14, further comprising a preload cap secured to the rotor intermediate the rotor and the encoder, with the rotor bearing sandwiched between the preload cap and the annular end cap.

17. The motion control apparatus of claim 14, further comprising a housing bearing, with the annular end including an inner axial opening having a flange extending radially relative to the axis and inwardly therefrom, with the rotor including a shoulder defined on the rotor, with the housing bearing sandwiched between the rotor and the inner axial opening and between the shoulder and the flange, with the rotor including rollers circumferentially arranged to be supported by a pair of annular plates, with the rotor and pair of annular plates integrally formed as a single undivided unit.

\* \* \* \* \*